United States Patent
Yan et al.

(10) Patent No.: US 7,755,915 B2
(45) Date of Patent: Jul. 13, 2010

(54) POWER SUPPLY CIRCUIT WITH AT LEAST ONE FEEDBACK CIRCUIT FEEDING OPERATING STATE OF TRANSFORMER BACK TO PULSE WIDTH MODULATION CIRCUIT THEREOF

(75) Inventors: Huai-Zhu Yan, Shenzhen (CN); Tong Zhou, Shenzhen (CN); Hong-Bo Zhou, Shehzhen (CN); Kun Le, Shenzhen (CN)

(73) Assignees: Innocom Technology (ShenZhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 278 days.

(21) Appl. No.: 11/999,235

(22) Filed: Dec. 3, 2007

(65) Prior Publication Data

US 2008/0130327 A1    Jun. 5, 2008

(30) Foreign Application Priority Data

Dec. 1, 2006    (TW) ............................... 95144727 A
Dec. 29, 2006   (TW) ............................... 95149686 A
Dec. 29, 2006   (TW) ............................... 95149700 A (51) Int. Cl.
    *H02M 3/335*    (2006.01)
(52) U.S. Cl. ............... 363/21.16; 363/21.12; 363/21.18
(58) Field of Classification Search .................... 363/20, 363/21.01, 21.12, 21.16, 21.18, 56.01, 56.09–56.11
    See application file for complete search history.

(56) References Cited

U.S. PATENT DOCUMENTS

| 4,608,625 | A |   | 8/1986  | Josephson et al. |           |
|-----------|---|---|---------|------------------|-----------|
| 5,703,764 | A | * | 12/1997 | Hermann et al.   | 363/21.16 |
| 5,973,941 | A | * | 10/1999 | Zaim             | 363/21.08 |
| 6,529,391 | B2| * | 3/2003  | Yoshinaga et al. | 363/21.15 |
| 7,035,122 | B2| * | 4/2006  | Kim et al.       | 363/21.18 |
| 7,064,966 | B2| * | 6/2006  | Yamada et al.    | 363/21.16 |
| 7,505,287 | B1| * | 3/2009  | Kesterson        | 363/21.01 |
| 7,583,519 | B2| * | 9/2009  | Piper et al.     | 363/21.16 |
| 2005/0135036 | A1 |   | 6/2005 | Kanamori et al.  |           |

FOREIGN PATENT DOCUMENTS

| CN | 1630175 A | 6/2005 |
| JP | 8-66021 A | 3/1996 |

* cited by examiner

*Primary Examiner*—Matthew V Nguyen
(74) *Attorney, Agent, or Firm*—Wei Te Chung (57) ABSTRACT

An exemplary power supply circuit (20) includes a first commutating and filter circuit (21), a transformer (24), a second commutating and filter circuit (25), a transistor (27), a pulse width modulation circuit (26) outputting a control signal to control operation state of the transistor, and a feedback circuit (29). An external alternating current voltage is converted into a direct current with a cooperation operating of the transistor, the first commutating and filter circuit, the transformer, and the second commutating and filter circuit. The feedback circuit feeds an operating state of the transformer back to the pulse width modulation circuit, and the pulse width modulation circuit outputs corresponding control signals to turn on or turn off the transistor.

15 Claims, 4 Drawing Sheets

POWER SUPPLY CIRCUIT WITH AT LEAST ONE FEEDBACK CIRCUIT FEEDING OPERATING STATE OF TRANSFORMER BACK TO PULSE WIDTH MODULATION CIRCUIT THEREOF

FIELD OF THE INVENTION

The present invention relates to a power supply circuit that can be used for liquid crystal display devices, the power supply circuit including at least one feedback circuit feeding an operating state of a transformer back to a pulse width modulation circuit.

BACKGROUND

Figure 4:
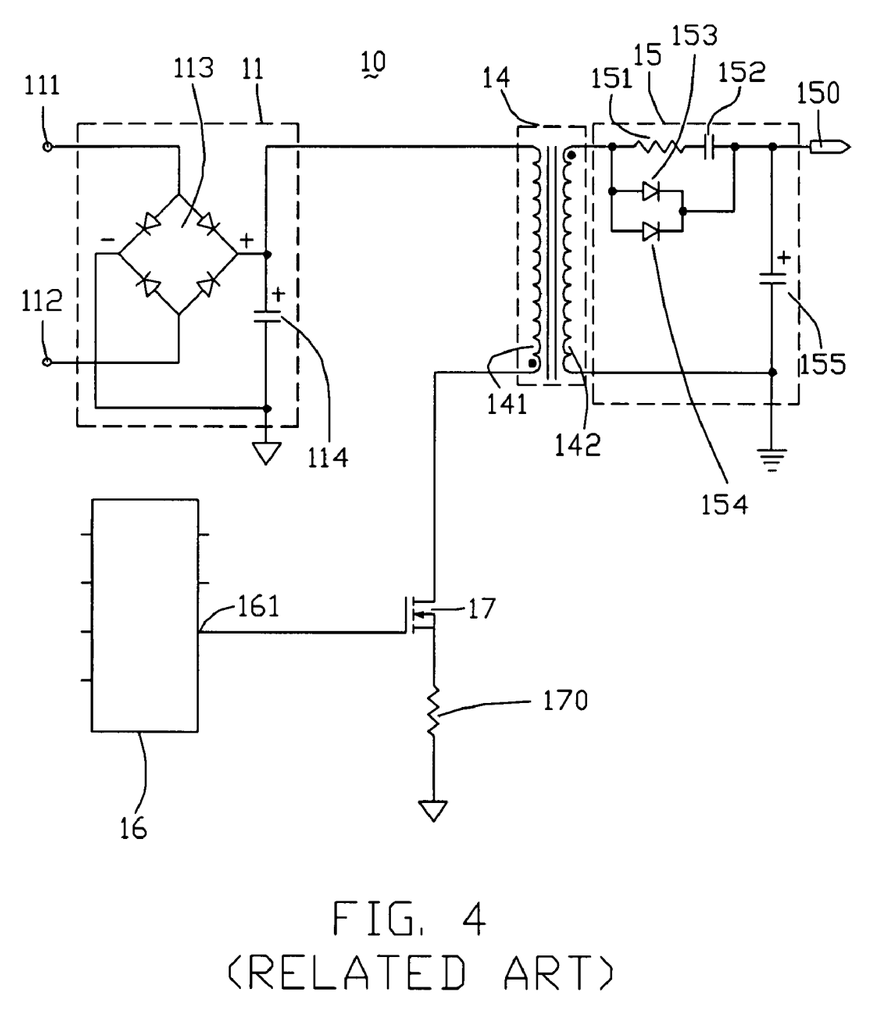
FIG. 4 is a diagram of a conventional power supply circuit.

In general, a liquid crystal display (LCD) device needs to have a power supply circuit installed therein, for converting an external alternating current (AC) voltage into a direct current (DC) voltage. A typical power supply circuit is shown in FIG. 4. The power supply circuit 10 includes two input terminals 111 and 112, an output terminal 150, a first commutating and filter circuit 11, a transformer 14, a second commutating and filter circuit 15, a pulse width modulation circuit 16, a transistor 17, and a current limiting resistor 170.

The first commutating and filter circuit 11 includes a full-bridge rectifier circuit 113 and a first filter capacitor 114. The full-bridge rectifier circuit 113 includes two input terminals (not labeled), a positive output terminal (not labeled), and a negative output terminal (not labeled). The two input terminals of the full-bridge rectifier circuit 113 are connected to the two input terminals 111 and 112, respectively. The positive output terminal of the full-bridge rectifier circuit 113 is connected to ground via the first filter capacitor 114. The negative output terminal of the full-bridge rectifier circuit 113 is directly connected to ground.

The transformer 14 includes a primary winding 141 and a secondary winding 142. The primary winding 141 includes two taps (not labeled). One of the taps of the primary winding 141 is connected to the positive output terminal of the full-bridge rectifier circuit 113, and the other tap of the primary winding 141 is connected to a source electrode of the transistor 17. The secondary winding 142 also includes two taps (not labeled).

The second commutating and filter circuit 15 includes a first resistor 151, a first capacitor 152, a first diode 153, a second diode 154, a second filter capacitor 155. The first resistor 151 and the first capacitor 152 are connected in series between a first one of the taps of the secondary winding 142 and the output terminal 150. An anode of the first diode 153 is connected to the first tap of the secondary winding 142, and a cathode of the first diode 153 is connected to the output terminal 150. An anode of the second diode 154 is also connected to the first tap of the secondary winding 142, and a cathode of the second diode 154 is connected to the output terminal 150. The second tap of the secondary winding 142 is connected to ground. The output terminal 150 is connected to ground via the second filter capacitor 155.

The pulse width modulation circuit 16 includes a control port 161. The control port 161 is used to output a high level signal or a low level signal to turn on or turn off the transistor 17.

A gate electrode of the transistor 17 is connected to the control port 161 of the pulse width modulation circuit 16. A drain electrode of the transistor 17 is connected to ground via the current limiting resistor 170.

The external AC voltage is inputted to the two input terminals 111 and 112. The AC voltage is converted into a direct current (DC) voltage via the first commutating and filter circuit 11.

When the transistor 17 is turned on, the first filter capacitor 114, the primary winding 141 of the transformer 14, the transistor 17, and the current limiting resistor 170 form a first circuit path (not labeled). The first filter capacitor 114 can be regarded as a power source, and the primary winding 141 can be regarded as an inductor. A current flowing through the primary winding 141 linearly increases until the current reaches a maximum value when a voltage of the first filter capacitor 114 is constant. Such voltage can be expressed by the following equation (1):

$$V = L\frac{dI}{dt} \tag{1}$$

where V represents the voltage of the first filter capacitor 114, L represents an inductance of the primary winding 141, I represents the current flowing through the primary winding 141, and t represents time.

When the transistor 17 is turned off, electrical energy stored in the primary winding 141 is transmitted to the secondary winding 142, and is then converted into a steady DC voltage via the second commutating and filter circuit 15. Then the steady DC voltage is outputted to circuits in other parts of the LCD device via the output terminal 150.

However, in practice, the external AC voltage may increase suddenly. When this happens, electrical energy stored in the primary winding 141 and the secondary winding 142 of the transformer 14 may increase significantly. The voltage outputted by the second commutating and filter circuit 15 correspondingly increases significantly. Thus, the output terminal 150 may apply a large voltage to the circuits in the other parts of the LCD device. The large voltage is liable to disrupt normal operation of the LCD device.

Furthermore, when the external AC voltage increases suddenly, the current flowing through the first circuit path and a current flowing through the second commutating and filter circuit 15 correspondingly increase significantly. If any electronic component of the power supply circuit 10 is thereby impaired or damaged, the whole power supply circuit 10 is liable to be burned out.

Accordingly, what is needed is a power supply circuit for LCD devices that can overcome the above-described deficiencies.

SUMMARY

In one aspect, a power supply circuit includes a first commutating and filter circuit, a transformer, a second commutating and filter circuit, a transistor, a pulse width modulation circuit, and at least one feedback circuit. The transformer includes a primary winding, a secondary winding, and at least one auxiliary winding. The pulse width modulation circuit includes at least one feedback port and a control port. The control port is configured for outputting one of a high level signal and a low level signal to effect a selective one of turning on or turning off the transistor. An external alternating current voltage is converted into a first direct current voltage via the first commutating and filter circuit. When the transistor is turned on, electrical energy stored in the primary winding linearly increases until the electrical energy reaches a maximum value. When the transistor is turned off, the electrical energy stored in the primary winding is transmitted to the secondary winding, then converted into a second direct current voltage via the second commutating and filter circuit. Electrical energy stored in the at least one auxiliary winding is fed back into the at least one feedback port of the pulse width modulation circuit. The pulse width modulation circuit compares a value of a feedback signal of the at least one feedback port and a reference value stored in the pulse width modulation circuit, and when the value of the feedback signal is larger than the reference value, the control port of the pulse width modulation circuit outputs said one of the high level signal and the low level signal to effect turning off the transistor.

In another aspect, a power supply circuit includes a first commutating and filter circuit, a transformer, a second commutating and filter circuit, a transistor, a pulse width modulation circuit outputting control signals to turn on and turn off the transistor, and at least one feedback circuit. An external alternating current voltage is converted into a direct current voltage by the transistor, the first commutating and filter circuit, the transformer, and the second commutating and filter circuit in cooperation. The at least one feedback circuit feeds an operating state of the transformer back to the pulse width modulation circuit, the pulse width modulation circuit outputs corresponding control signals to turn on or turn off the transistor.

Other novel features and advantages will become apparent from the following detailed description of preferred and exemplary embodiments when taken in conjunction with the accompanying drawings.

DETAILED DESCRIPTION OF PREFERRED EMBODIMENTS

Reference will now be made to the drawings to describe preferred and exemplary embodiments in detail.

Figure 1:
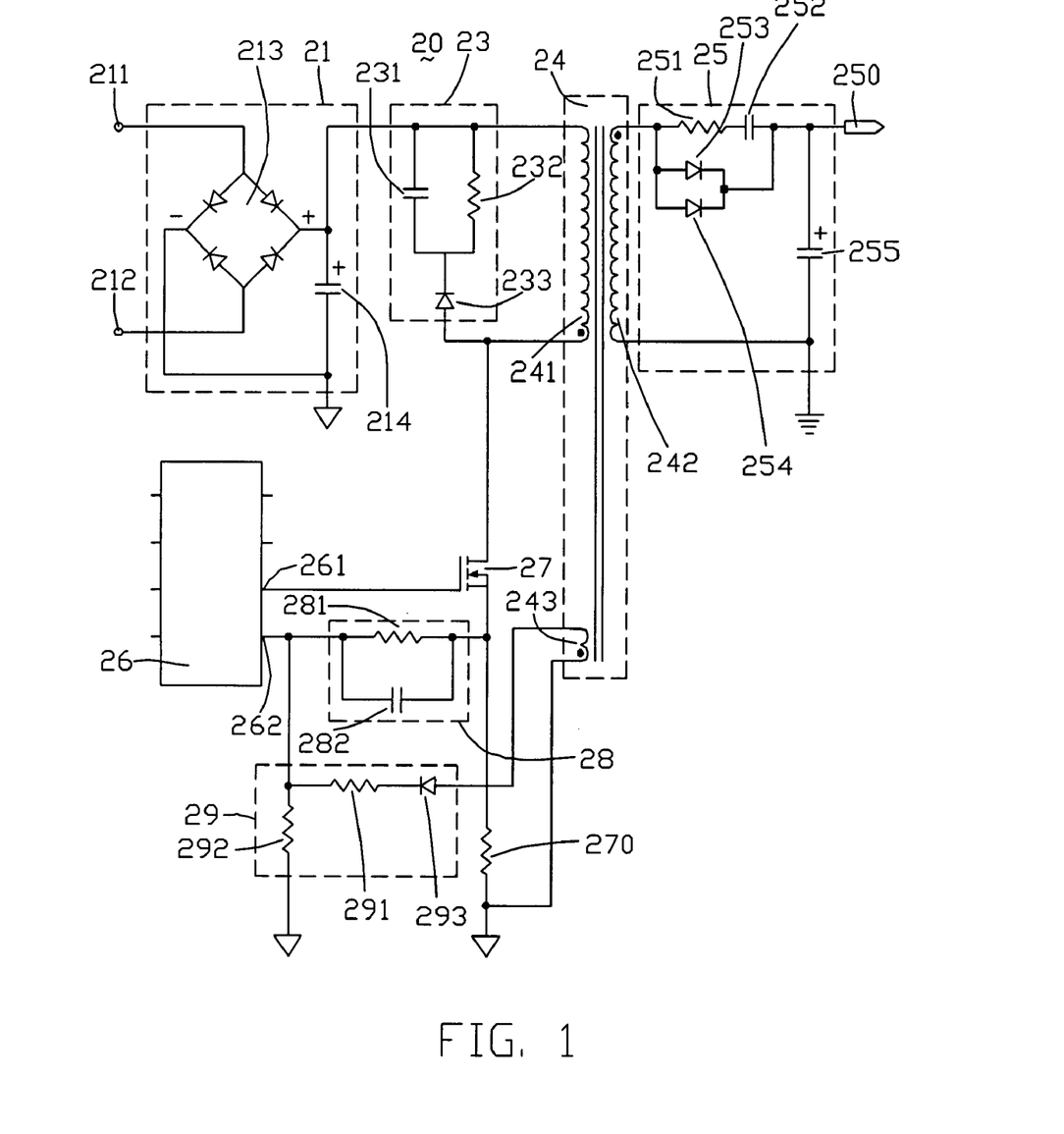
FIG. 1 is a diagram of a power supply circuit according to a first embodiment of the present invention.

FIG. 1 is a diagram of a power supply circuit 20 according to a first embodiment of the present invention. The power supply circuit 20 includes two input terminals 211 and 212, an output terminal 250, a first commutating and filter circuit 21, a protection circuit 23, a transformer 24, a second commutating and filter circuit 25, a pulse width modulation circuit 26, a transistor 27, a first feedback circuit 28, a second feedback circuit 29, and a current limiting resistor 270. The transistor 27 is an N-channel enhancement mode metal-oxide-semiconductor field-effect transistor.

The first commutating and filter circuit 21 includes a full-bridge rectifier circuit 213 and a first filter capacitor 214. The full-bridge rectifier circuit 213 includes two input terminals (not labeled), a positive output terminal (not labeled), and a negative output terminal (not labeled). The two input terminals of the full-bridge rectifier circuit 213 are connected to the two input terminals 211 and 212, respectively. The positive output terminal of the full-bridge rectifier circuit 213 is connected to ground via the first filter capacitor 214. The negative output terminal of the full-bridge rectifier circuit 213 is directly connected to ground.

The protection circuit 23 includes a first capacitor 231, a first resistor 232, and a first diode 233. The first capacitor 231 is connected between the positive output terminal of the full-bridge rectifier circuit 213 and a cathode of the first diode 233. The first resistor 232 is also connected between the positive output terminal of the full-bridge rectifier circuit 213 and the cathode of the first diode 233.

The transformer 24 includes a primary winding 241, a secondary winding 242, and an auxiliary winding 243. The primary winding 241 includes two taps (not labeled). One of the taps of the primary winding 241 is connected to the positive output terminal of the full-bridge rectifier circuit 213, and the other tap of the primary winding 241 is connected to an anode of the first diode 233. The secondary winding 242 and the auxiliary winding 243 include two taps (not labeled), respectively.

The second commutating and filter circuit 25 includes a second resistor 251, a second capacitor 252, a second diode 253, a third diode 254, and a second filter capacitor 255. The second resistor 251 and the second capacitor 252 are connected in series between a first one of the taps of the secondary winding 242 and the output terminal 250. An anode of the second diode 253 is connected to the first tap of the secondary winding 242, and a cathode of the second diode 253 is connected to the output terminal 250. An anode of the third diode 254 is connected to the first tap of the secondary winding 242, and a cathode of the third diode 254 is connected to the output terminal 250. The second tap of the secondary winding 242 is connected to ground. The output terminal 250 is connected to ground via the second filter capacitor 255.

The pulse width modulation circuit 26 includes a control port 261 and a first feedback port 262. The control port 261 is used to output a high level signal or a low level signal to turn on or turn off the transistor 27. The first feedback port 262 is a voltage sampling port.

A gate electrode of the transistor 27 is connected to the control port 261 of the pulse width modulation circuit 26. A source electrode of the transistor 27 is connected to the anode of the first diode 233. A drain electrode of the transistor 27 is connected to ground via the current limiting resistor 270.

The first feedback circuit 28 includes a third resistor 281 and a third capacitor 282. The third resistor 281 is connected between the first feedback port 262 of the pulse width modulation circuit 26 and the drain electrode of the transistor 27. The third capacitor 282 is connected between the first feedback port 262 of the pulse width modulation circuit 26 and the drain electrode of the transistor 27.

The second feedback circuit 29 includes a fourth resistor 291, a fifth resistor 292, and a fourth diode 293. A cathode of the fourth diode 293 is connected to the first feedback port 262 of the pulse width modulation circuit 26 via the fourth resistor 291. An anode of the fourth diode 293 is connected to one of the taps of the auxiliary winding 243. The other tap of the auxiliary winding 243 is connected to ground. The first feedback port 262 of the pulse width modulation circuit 26 is connected to ground via the fifth resistor 292.

An external AC voltage is applied to the two input terminals 211 and 212, and is converted into a direct current DC voltage when passing through the first commutating and filter circuit 21.

When the transistor 27 is turned on, the first filter capacitor 214, the primary winding 241 of the transformer 24, the transistor 27, and the current limiting resistor 270 cooperatively form a first circuit path (not labeled). The first filter capacitor 214 can be regarded as a power source, and the primary winding 241 can be regarded as an inductor. A current flowing through the primary winding 241 linearly increases until the current reaches a maximum value when a voltage of the first filter capacitor 214 is constant. The voltage it can be expressed by the following equation (2):

$$V = L\frac{dI}{dt} \quad (2)$$

wherein V represents the voltage of the first filter capacitor 214, L represents an inductance of the primary winding 241, I represents the current flowing through the primary winding 241, and t represents time.

The auxiliary winding 243 of the transformer 24, the fourth diode 293, the fourth resistor 291, and the fifth resistor 292 cooperatively form a second circuit path (not labeled). The auxiliary winding 243 can be regarded as a power source. An induction electromotive force of the auxiliary winding 243 is constant while the current flowing through the primary winding 241 is linearly increasing. The induction electromotive force can be expressed by the following equation (3):

$$\varepsilon = M\frac{dI}{dt} \quad (3)$$

where ε represents the induction electromotive force of the auxiliary winding 243, M represents a mutual inductance of the primary winding 241 and the auxiliary winding 243, I represents the current flowing through the primary winding 241, and t represents time.

A voltage of the current limiting resistor 270 is inputted to the first feedback port 262 of the pulse width modulation circuit 26 via the first feedback circuit 28. When the induction electromotive force of the auxiliary winding 243 is constant, the voltage of the fifth resistor 292 is constant accordingly. The voltage of the fifth resistor 292 is inputted to the first feedback port 262 of the pulse width modulation circuit 26. That is, the first feedback port 262 receives a sum of the voltage of the current limiting resistor 270 and the voltage of the fifth resistor 292. The pulse width modulation circuit 26 compares a value of the sum voltage and a reference value stored in the pulse width modulation circuit 26. When the value of the sum voltage is larger than the reference value, the control port 261 of the pulse width modulation circuit 26 outputs the low level signal to turn off the transistor 27.

When the transistor 27 is turned off, electrical energy stored in the primary winding 241 is transmitted to the secondary winding 242, and is then converted into a steady DC voltage via the second commutating and filter circuit 25. An excitation current of the primary winding 241 is consumed by the protection circuit 23.

One test result of an over current threshold point of the output terminal 250 of the power supply circuit 20 is as follows. When the external AC voltage is 100V (volts), the over current point of the output terminal 250 is 2.61 A (amperes); and when the external AC voltage is 240V, the over current point of the output terminal 250 is 2.62 A. That is, the over current point of the output terminal 250 of the power supply circuit 20 generally remains constant regardless of the external AC voltage.

In practice, the external AC voltage may increase suddenly. When this happens, electrical energy stored in the primary winding 241 of the transformer 24 may increase significantly, and the induction electromotive force of the auxiliary winding 243 correspondingly increases. The change of the electrical energy stored in the auxiliary winding 243 is fed back to the pulse width modulation circuit 26 via the second feedback circuit 29. When the value of the feedback signal is larger than the reference value stored in the pulse width modulation circuit 26, the control port 261 of the pulse width modulation circuit 26 outputs the low level signal to turn off the transistor 27. The first circuit path is in an open circuit state accordingly. The electrical energy stored in the primary winding 241 does not increase, and does not exceed a maximum safe threshold value in respect of the primary winding 241. The electrical energy stored in the secondary winding 242 correspondingly does not exceed a maximum safe threshold value in respect of the secondary winding 242. Thus, the DC voltage outputted by the output terminal 250 remains constant. That is, the LCD device still operates normally when the external AC voltage increases suddenly.

Because the electrical energy stored in the primary winding 241 is not larger than the maximum safe threshold value thereof when the external AC voltage increases suddenly, and the electrical energy stored in the secondary winding 242 is not larger than the maximum safe threshold value thereof correspondingly, the current flowing through the first circuit path does not exceed a maximum safe threshold value in respect of the first circuit path, and a current flowing through the second commutating and filter circuit 15 does not exceed a maximum safe threshold value in respect of the second commutating and filter circuit 15. Thus, a risk of the power supply circuit 20 being burned out is effectively reduced or even eliminated.

Furthermore, when the external AC voltage is supplied by various electrical power sources, the over current point of the output terminal 250 of the power supply circuit 20 generally remains constant regardless of the external AC voltage.

In the first embodiment of the present invention, the transistor 27 can also be a P-channel depletion mode metal-oxide-semiconductor field-effect transistor. Under this condition, the transistor 27 is turned off when the gate electrode receives a high level signal, and the transistor 27 is turned on when the gate electrode receives a low level signal.

Figure 2:
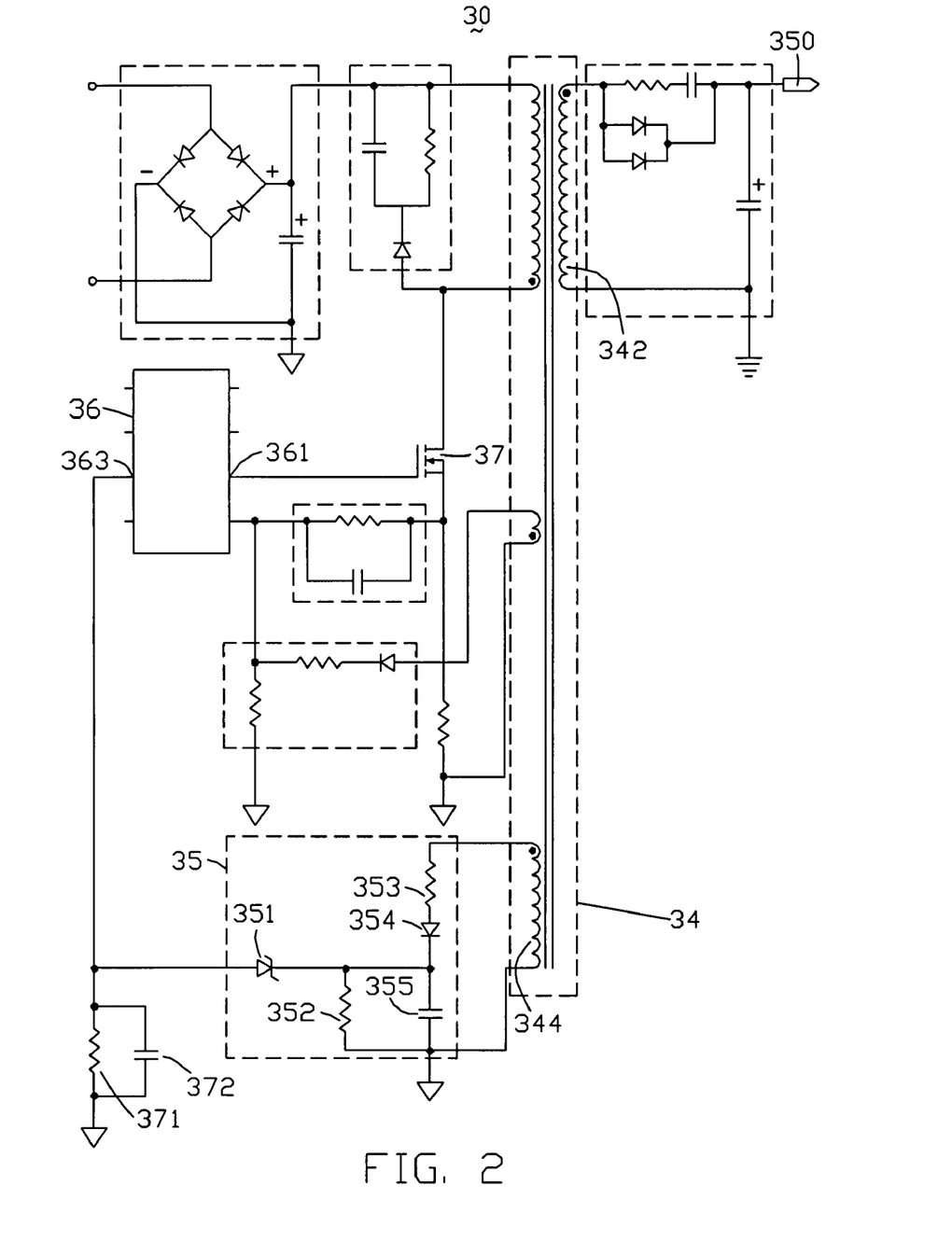
FIG. 2 is a diagram of a power supply circuit according to a second embodiment of the present invention.

FIG. 2 is a diagram of a power supply circuit 30 according to a second embodiment of the present invention. The power supply circuit 30 is similar to the power supply circuit 20. However, unique characteristics of the power supply circuit 30 are as follows:

The power supply circuit 30 further includes a third feedback circuit 35, an eighth resistor 371, and a fifth capacitor 372. The transformer 34 further includes a second auxiliary winding 344. The second auxiliary winding 344 includes two taps (not labeled). The pulse width modulation circuit 36 includes a second feedback port 363. The second feedback port 363 is an over voltage protection port. The feedback circuit 35 includes a zener diode 351, a sixth resistor 352, a seventh resistor 353, a fifth diode 354, and a fourth capacitor 355. One of the taps of the second auxiliary winding 344 is connected to an anode of the fifth diode 354 via the seventh resistor 353, and the other tap of the second auxiliary winding 344 is connected to ground. A cathode of the fifth diode 354 is connected to a cathode of the zener diode 351, and the cathode of fifth diode 354 is also connected to ground via the fourth capacitor 355. The cathode of the zener diode 351 is also connected to ground via the sixth resistor 352, and an anode of the zener diode 351 is connected to the second feedback port 363 of the pulse width modulation circuit 36. The eighth resistor 371 and the fifth capacitor 372 are connected in parallel between the second feedback port 363 and ground.

When the transistor 37 is turned off, the second auxiliary winding 344 of the transformer 34, the seventh resistor 353, the fifth diode 354, and the sixth resistor 352 form a third circuit path (not labeled). The second auxiliary winding 344 can be regarded as a power source. A voltage of the sixth resistor 352 increases while an induction electromotive force of the second auxiliary winding 344 is increasing. The voltage can be expressed by the following equation (4):

$$V_6 = \frac{R_6 \times \varepsilon_2}{R_6 + R_D + R_7} \qquad (4)$$

where $V_6$ represents the voltage of the sixth resistor 352, $R_6$ represents a resistance of the sixth resistor 352, $R_D$ represents an equivalent resistance of the fifth diode 354, $R_7$ represents a resistance of the seventh resistor 353, and $\varepsilon_2$ represents the induction electromotive force of the second auxiliary winding 344.

A voltage of the zener diode 351 is constant because of its own steady voltage characteristic. The second feedback port 363 of the pulse width modulation circuit 36 receives a sum of the voltage of the zener diode 351 and the voltage of the sixth resistor 352.

When the voltage outputted by the output terminal 350 is larger than a predetermined maximum threshold, the electrical energy stored in the secondary winding 342 is larger than a normal value thereof. The electrical energy stored in the second auxiliary winding 344 is larger than a normal value thereof accordingly. The voltage of the sixth resistor 352 increases, and the sum of the voltage of the zener diode 351 and the voltage of the sixth resistor 352 correspondingly increases. The pulse width modulation circuit 36 compares a value of the sum voltage and a reference value stored in the pulse width modulation circuit 36. When the value of the sum voltage is larger than the reference value, the control port 361 of the pulse width modulation circuit 36 outputs a low level signal to turn off the transistor 37. That is, the power supply circuit 30 has an over voltage protection function, as compared with the power supply circuit 20.

Figure 3:
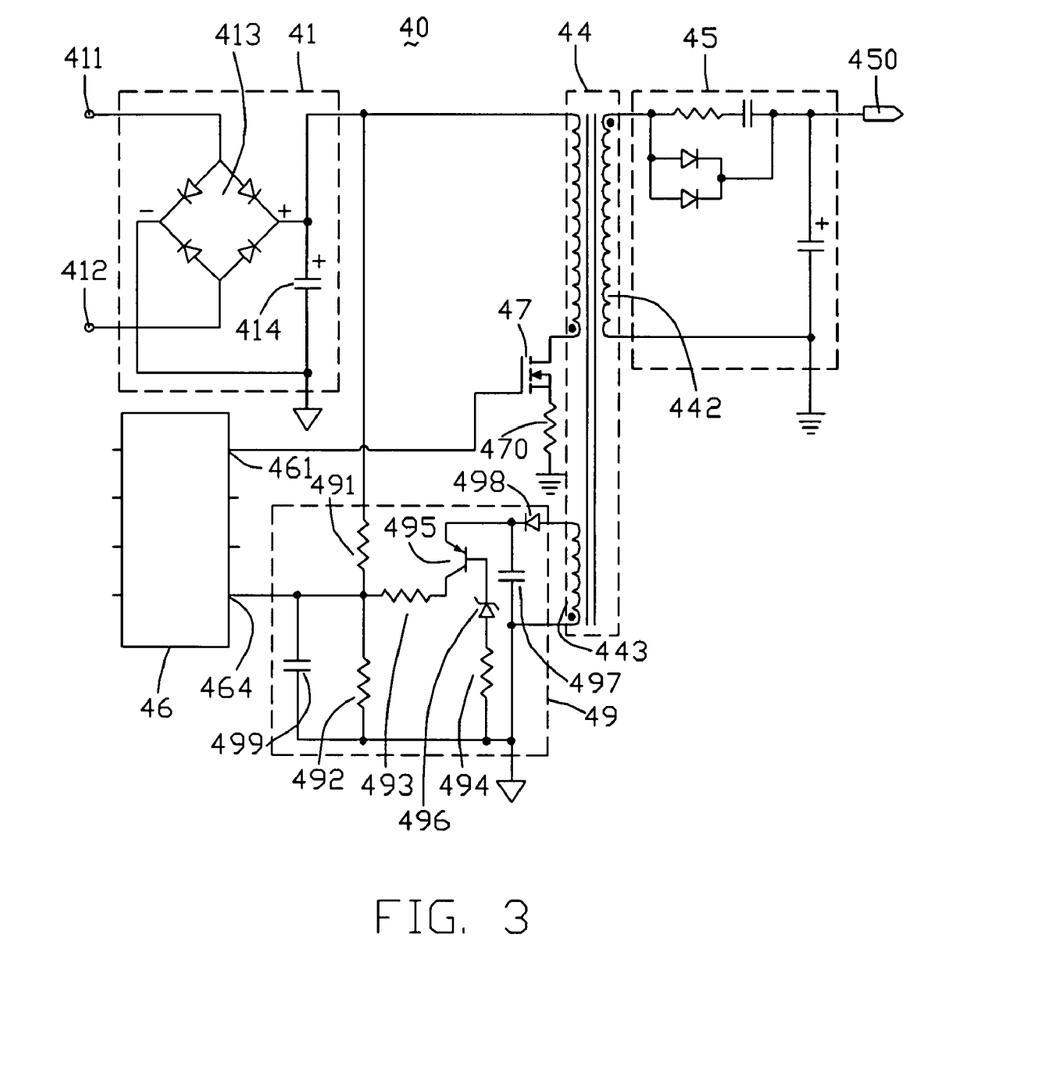
FIG. 3 is a diagram of a power supply circuit according to a third embodiment of the present invention.

FIG. 3 is a circuit diagram of a power supply circuit 40 according to a third embodiment of the present invention. The power supply circuit 40 includes two input terminals 411 and 412, an output terminal 450, a first commutating and filter circuit 41, a transformer 44, a second commutating and filter circuit 45, a pulse width modulation circuit 46, a transistor 47, a feedback circuit 49, and a current limiting resistor 470. The first commutating and filter circuit 41 is substantially the same as the first commutating and filter circuit 21 of the power supply circuit 20. The transformer 44 is substantially the same as the transformer 24 of the power supply circuit 20. The second commutating and filter circuit 45 is substantially the same as the second commutating and filter circuit 25 of the power supply circuit 20. The pulse width modulation circuit 46 is substantially the same as the pulse width modulation circuit 26 of the power supply circuit 20. The transistor 47 is substantially the same as the transistor 27 of the power supply circuit 20. The current limiting resistor 470 is substantially the same as the current limiting resistor 270 of the power supply circuit 20. Connection relationships of the two input terminals 411 and 412, the output terminal 450, the first commutating and filter circuit 41, the transformer 44, the second commutating and filter circuit 45, the pulse width modulation circuit 46, the transistor 47, and the current limiting resistor 470 are substantially the same as those of the two terminals 211 and 212, the output terminal 250, the first commutating and filter circuit 21, the transformer 24, the second commutating and filter circuit 25, the pulse width modulation circuit 26, the transistor 27, and the current limiting resistor 270 of the power supply circuit 20.

The feedback circuit 49 includes a ninth resistor 491, a tenth resistor 492, an eleventh resistor 493, a twelfth resistor 494, a bipolar transistor 495, a zener diode 496, a sixth capacitor 497, a sixth diode 498, and a seventh capacitor 499. The pulse width modulation circuit 46 further includes a third feedback port 464. The third feedback port 464 is an under voltage protection port. The ninth resistor 491 and the tenth resistor 492 are connected in series between the positive output terminal of the full-bridge rectifier circuit 413 and ground. The eleventh resistor 493 is connected between the third feedback port 464 and a collector electrode of the bipolar transistor 495. An emitter electrode of the bipolar transistor 495 is connected to a cathode of the sixth diode 498, and a base electrode of the bipolar transistor 495 is connected to a cathode of the zener diode 496. The cathode of the sixth diode 498 is also connected to ground via the sixth capacitor 497. An anode of the sixth diode 498 is connected to one of the taps of the auxiliary winding 443. The other tap of the auxiliary winding 443 is connected to ground. An anode of the zener diode 496 is connected to ground via the twelfth resistor 494. The third feedback port 464 is connected to ground via the seventh capacitor 499.

A voltage of the tenth resistor 492 is inputted to the third feedback port 464 of the pulse width modulation circuit 46. When the external AC voltage is less than a predetermined minimum threshold, a value of the voltage of the tenth resistor 492 is less than a reference value stored in the pulse width modulation circuit 46. The pulse width modulation circuit 46 is in a clamping protection state accordingly.

When a voltage outputted by the output terminal 450 is larger than a predetermined maximum threshold, electrical energy stored in the secondary winding 442 is larger than a normal value thereof. Electrical energy stored in the auxiliary winding 443 is larger than a normal value thereof accordingly. A voltage of the emitter electrode of the bipolar transistor 495 is larger than a normal value thereof, but a voltage of the base electrode of the bipolar transistor 495 is constant because of the voltage stabilizing function of the zener diode 496. Thus, the bipolar transistor 495 is turned on. The auxiliary winding 443 of the transformer 44, the sixth diode 498, the bipolar transistor 495, the eleventh resistor 493, and the tenth resistor 492 form a fourth circuit path (not labeled). The auxiliary winding 443 can be regarded as a power source. When the electrical energy stored in the auxiliary winding 443 increases, the voltage of the tenth resistor 492 correspondingly increases. The voltage of the tenth resistor 492 is inputted to the third feedback port 464 of the pulse width modulation circuit 46. The pulse width modulation circuit 46 compares the value of the voltage and the reference value stored in the pulse width modulation circuit 46. When the value of the voltage is larger than the reference value, the control port 461 of the pulse width modulation circuit 46 outputs a high level signal to turn off the transistor 47. That is, the power supply circuit 40 has an over voltage protection function, The power supply circuit 40 utilizes the third feedback port 464 of the pulse width modulation circuit 46 to realize the over voltage protection function, and the third feedback port 464 is also the under voltage protection port of the power supply circuit 40. Thus, an application range of the under voltage protection port of the pulse width modulation circuit 46 is extended.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A power supply circuit, comprising:
  a first commutating and filter circuit;
  a transformer comprising a primary winding, a secondary winding, and at least one auxiliary winding, the at least one auxiliary winding comprising a first auxiliary winding comprising two taps;
  a second commutating and filter circuit;
  a transistor, a drain electrode of the transistor being connected to ground via a current limiting resistor;
  a pulse width modulation circuit comprising a first feedback port and a control port, the control port configured for outputting one of a high level signal and a low level signal to effect a selective one of turning on or turning off the transistor; and
  at least one feedback circuit comprising a first feedback circuit and a second feedback circuit; the first feedback circuit comprising a first resistor, a second resistor, and a diode, a cathode of the diode being connected to the first feedback port via the first resistor, an anode of the diode being connected to one of the two taps of the first auxiliary winding, the other tap of the first auxiliary winding being connected to ground, and the first feedback port being connected to ground via the second resistor; the second feedback circuit comprising a third resistor and a first capacitor, the third resistor being connected between the first feedback port and the drain electrode of the transistor, and the first capacitor being connected between the first feedback port and the drain electrode of the transistor;
  wherein an external alternating current voltage is converted into a first direct current voltage via the first commutating and filter circuit;
  when the transistor is turned on, electrical energy stored in the primary winding linearly increases until the electrical energy reaches a maximum value;
  when the transistor is turned off, the electrical energy stored in the primary winding is transmitted to the secondary winding, and is then converted into a second direct current voltage via the second commutating and filter circuit;
  electrical energy stored in the first auxiliary winding is fed back into the first feedback port of the pulse width modulation circuit; and
  the pulse width modulation circuit compares a value of a feedback signal of the first feedback port and a reference value stored in the pulse width modulation circuit, and when the value of the feedback signal is larger than the reference value, the control port of the pulse width modulation circuit outputs said one of the high level signal and the low level signal to effect turning off the transistor.

2. The power supply circuit as claimed in claim 1, further comprising two input terminals, wherein the first commutating and filter circuit comprises a full-bridge rectifier circuit and a first filter capacitor, two input terminals of the full-bridge rectifier circuit are connected to the two input terminals of the power supply circuit respectively, a positive output terminal of the full-bridge rectifier circuit is connected to ground via the first filter capacitor, and a negative output terminal of the full-bridge rectifier circuit is connected to ground.

3. The power supply circuit as claimed in claim 2, further comprising a protection circuit, wherein the protection circuit comprises a second capacitor, a fourth resistor, and a second diode, the second capacitor is connected between the positive output terminal of the full-bridge rectifier circuit and a cathode of the second diode, the fourth resistor is also connected between the positive output terminal of the full-bridge rectifier circuit and the cathode of the second diode, and an anode of the second diode is connected to a source electrode of the transistor.

4. The power supply circuit as claimed in claim 3, further comprising an output terminal, wherein the second commutating and filter circuit comprises a fifth resistor, a third capacitor, a third diode, a fourth diode, and a second filter capacitor, the secondary winding comprises two taps, the fifth resistor and the third capacitor are connected in series between a first one of the taps of the secondary winding and the output terminal, an anode of the third diode is connected to the first tap of the secondary winding, a cathode of the third diode is connected to the output terminal, an anode of the fourth diode is connected to the first tap of the secondary winding, a cathode of the fourth diode is connected to the output terminal, the second tap of the secondary winding is connected to ground, and the output terminal is connected to ground via the second filter capacitor.

5. The power supply circuit as claimed in claim 1, wherein the at least one feedback circuit further comprises a third feedback circuit, the pulse width modulation circuit further comprises a second feedback port, the transformer further comprises a second auxiliary winding, the second auxiliary winding comprises two taps, the third feedback circuit comprises a zener diode, a third resistor, a fourth resistor, a second diode, and a capacitor, one of the two taps of the second auxiliary winding is connected to an anode of the second diode via the fourth resistor, the other tap of the second auxiliary winding is connected to ground, a cathode of the second diode is connected to a cathode of the zener diode, the cathode of second diode is also connected to ground via the capacitor, the cathode of the zener diode is also connected to ground via the third resistor, and an anode of the zener diode is connected to the second feedback port of the pulse width modulation circuit.

6. A power supply circuit, comprising:
  a first commutating and filter circuit;
  a transformer comprising a primary winding, a secondary winding, a first auxiliary winding and a second auxiliary winding, each of the first auxiliary winding and the second auxiliary winding comprising two taps;
  a second commutating and filter circuit;
  a transistor;
  a pulse width modulation circuit comprising a first feedback port, a second feedback port, and a control port, the control port configured for outputting one of a high level signal and a low level signal to effect a selective one of turning on or turning off the transistor; and
  a first feedback circuit comprising a first resistor, a second resistor, and a first diode, a cathode of the first diode being connected to the first feedback port via the first resistor, an anode of the first diode being connected to one of the taps of the first auxiliary winding, the other tap of the first auxiliary winding being connected to ground, and the first feedback port being connected to ground via the second resistor;

a second feedback circuit comprising a zener diode, a third resistor, a fourth resistor, a second diode, and a capacitor, one of the taps of the second auxiliary winding being connected to an anode of the second diode via the fourth resistor, the other tap of the second auxiliary winding being connected to ground, a cathode of the second diode being connected to a cathode of the zener diode, the cathode of second diode being also connected to ground via the capacitor, the cathode of the zener diode being also connected to ground via the third resistor, and an anode of the zener diode being connected to the second feedback port;

wherein an external alternating current voltage is converted into a first direct current voltage via the first commutating and filter circuit;

when the transistor is turned on, electrical energy stored in the primary winding linearly increases until the electrical energy reaches a maximum value;

when the transistor is turned off, the electrical energy stored in the primary winding is transmitted to the secondary winding, and is then converted into a second direct current voltage via the second commutating and filter circuit;

electrical energy stored in the first and second auxiliary windings are fed back into the first and second feedback ports of the pulse width modulation circuit, respectively; and the pulse width modulation circuit compares a value of a feedback signal of each of the first and second feedback ports and a corresponding reference value stored in the pulse width modulation circuit, and when the value of the feedback signal is larger than the reference value, the control port of the pulse width modulation circuit outputs said one of the high level signal and the low level signal to effect turning off the transistor.

7. The power supply circuit as claimed in claim 6, further comprising a current limiting resistor, wherein the drain electrode of the transistor is connected to ground via the current limiting resistor.

8. The power supply circuit as claimed in claim 7, wherein the at least one feedback circuit further comprises a third feedback circuit, the third feedback circuit comprises a fifth resistor and a second capacitor, the fifth resistor is connected between the first feedback port of the pulse width modulation circuit and the drain electrode of the transistor, and the second capacitor is connected between the first feedback port of the pulse width modulation circuit and the drain electrode of the transistor.

9. The power supply circuit as claimed in claim 8, further comprising two input terminals, wherein the first commutating and filter circuit comprises a full-bridge rectifier circuit and a first filter capacitor, two input terminals of the full-bridge rectifier circuit are connected to the two input terminals of the power supply circuit respectively, a positive output terminal of the full-bridge rectifier circuit is connected to ground via the first filter capacitor, and a negative output terminal of the full-bridge rectifier circuit is connected to ground.

10. The power supply circuit as claimed in claim 9, further comprising a protection circuit, wherein the protection circuit comprises a third capacitor, a sixth resistor, and a third diode, the third capacitor is connected between the positive output terminal of the full-bridge rectifier circuit and a cathode of the third diode, the sixth resistor is also connected between the positive output terminal of the full-bridge rectifier circuit and the cathode of the third diode, and an anode of the third diode is connected to a source electrode of the transistor.

11. The power supply circuit as claimed in claim 10, further comprising an output terminal, wherein the second commutating and filter circuit comprises a seventh resistor, a fourth capacitor, a fourth diode, a fifth diode, and a second filter capacitor, the seventh resistor and the fourth capacitor are connected in series between a first one of the taps of the secondary winding and the output terminal, an anode of the fourth diode is connected to the first tap of the secondary winding, a cathode of the fourth diode is connected to the output terminal, an anode of the fifth diode is connected to the first tap of the secondary winding, a cathode of the fifth diode is connected to the output terminal, the second tap of the secondary winding is connected to ground, and the output terminal is connected to ground via the second filter capacitor.

12. A power supply circuit, comprising:
a first commutating and filter circuit;
a transformer comprising a primary winding comprising two taps, a secondary winding, and an auxiliary winding comprising two taps;
a second commutating and filter circuit;
a transistor;
a pulse width modulation circuit comprising a feedback port and a control port, the control port configured for outputting one of a high level signal and a low level signal to effect a selective one of turning on or turning off the transistor; and
a feedback circuit, wherein the feedback circuit comprises a first resistor, a second resistor, a third resistor, a fourth resistor, a bipolar transistor, a zener diode, a first capacitor, a second capacitor, and a diode, the first resistor and the second resistor are connected in series between one of the taps of the primary winding and ground, the third resistor is connected between the feedback port and a collector electrode of the bipolar transistor, an emitter electrode of the bipolar transistor is connected to a cathode of the diode, a base electrode of the bipolar transistor is connected to a cathode of the zener diode, the cathode of the diode is also connected to ground via the first capacitor, an anode of the diode is connected to one of the taps of the auxiliary winding, the other tap of the auxiliary winding is connected to ground, an anode of the zener diode is connected to ground via the fourth resistor, and the feedback port is connected to ground via the second capacitor;

wherein an external alternating current voltage is converted into a first direct current voltage via the first commutating and filter circuit;

when the transistor is turned on, electrical energy stored in the primary winding linearly increases until the electrical energy reaches a maximum value;

when the transistor is turned off, the electrical energy stored in the primary winding is transmitted to the secondary winding, and is then converted into a second direct current voltage via the second commutating and filter circuit;

electrical energy stored in the auxiliary winding is fed back into the feedback port of the pulse width modulation circuit; and the pulse width modulation circuit compares a value of a feedback signal of the feedback port and a reference value stored in the pulse width modulation circuit, and when the value of the feedback signal is larger than the reference value, the control port of the pulse width modulation circuit outputs said one of the high level signal and the low level signal to effect turning off the transistor.

13. The power supply circuit as claimed in claim 12, further comprising a current limiting resistor, wherein the drain electrode of the transistor is connected to ground via the current limiting resistor.

14. The power supply circuit as claimed in claim 13, further comprising two input terminals, wherein the first commutating and filter circuit comprises a full-bridge rectifier circuit and a first filter capacitor, two input terminals of the full-bridge rectifier circuit are connected to the two input terminals of the power supply circuit respectively, a positive output terminal of the full-bridge rectifier circuit is connected to ground via the first filter capacitor, and a negative output terminal of the full-bridge rectifier circuit is connected to ground.

15. The power supply circuit as claimed in claim 14, further comprising an output terminal, wherein the second commutating and filter circuit comprises a fifth resistor, a third capacitor, a second diode, a third diode, and a second filter capacitor, the fifth resistor and the third capacitor are connected in series between a first one of the taps of the secondary winding and the output terminal, an anode of the second diode is connected to the first tap of the secondary winding, a cathode of the second diode is connected to the output terminal, an anode of the third diode is connected to the first tap of the secondary winding, a cathode of the third diode is connected to the output terminal, the second tap of the secondary winding is connected to ground, and the output terminal is connected to ground via the second filter capacitor.

* * * * *